(12) United States Patent
Barker

(10) Patent No.: US 8,708,370 B1
(45) Date of Patent: Apr. 29, 2014

(54) SAFETY ENHANCEMENT FOR A SAFETY BELT

(76) Inventor: John Barker, Rupert, ID (US)

( * ) Notice: Subject to any disclaimer, the term of this patent is extended or adjusted under 35 U.S.C. 154(b) by 0 days.

(21) Appl. No.: 13/555,501

(22) Filed: Jul. 23, 2012

(51) Int. Cl.
*B60R 22/28* (2006.01)
*B60R 22/44* (2006.01)

(52) U.S. Cl.
USPC .............. 280/805; 280/807; 188/290; 267/34

(58) Field of Classification Search
USPC ........ 280/805, 802, 807; 242/379.1; 297/470, 297/474, 475, 469; 188/318, 286, 290, 294; 267/34, 272, 113
See application file for complete search history.

(56) References Cited

U.S. PATENT DOCUMENTS

| | | | | |
|---|---|---|---|---|
| 2,905,231 A * | 9/1959 | Olson | | 280/807 |
| 3,195,685 A | 7/1965 | Blackstone | | |
| 3,744,814 A | 7/1973 | Sturman | | |
| 3,804,192 A | 4/1974 | Takada | | |
| 3,891,272 A | 6/1975 | Takada et al. | | |
| 3,947,058 A | 3/1976 | Laporte | | |
| 4,008,909 A | 2/1977 | Otani | | |
| 4,084,841 A * | 4/1978 | Hayashi et al. | | 280/802 |
| 4,550,951 A | 11/1985 | Apri | | |
| 4,674,608 A * | 6/1987 | Morris et al. | | 188/290 |
| 4,738,485 A | 4/1988 | Rumpf | | |
| 5,040,646 A | 8/1991 | Drefahl | | |
| 5,054,815 A | 10/1991 | Gavagan | | |
| 5,468,045 A | 11/1995 | Weber | | |
| 5,516,199 A * | 5/1996 | Crook et al. | | 297/468 |
| 5,722,689 A | 3/1998 | Chen et al. | | |
| 5,749,601 A * | 5/1998 | Knoll et al. | | 280/805 |
| 6,102,439 A * | 8/2000 | Smithson et al. | | 280/805 |
| 6,129,385 A * | 10/2000 | Blackadder | | 280/805 |
| 6,145,881 A | 11/2000 | Miller et al. | | |
| 6,183,015 B1 * | 2/2001 | Smithson et al. | | 280/805 |
| 6,193,296 B1 | 2/2001 | Motozawa et al. | | |
| 6,196,589 B1 * | 3/2001 | Smithson et al. | | 280/805 |
| 6,209,916 B1 * | 4/2001 | Smithson et al. | | 280/805 |
| 6,260,926 B1 | 7/2001 | Meraw | | |
| 6,322,017 B1 | 11/2001 | Smithson et al. | | |
| 6,393,624 B1 * | 5/2002 | Iwashita | | 4/248 |
| 6,655,743 B1 | 12/2003 | Parizat et al. | | |
| 6,659,505 B1 * | 12/2003 | Knox | | 280/806 |
| 6,695,243 B2 | 2/2004 | Specht | | |
| 6,739,541 B2 | 5/2004 | Palliser et al. | | |
| 6,863,308 B2 | 3/2005 | Motozawa | | |
| 7,059,458 B2 | 6/2006 | Borg et al. | | |
| 7,111,712 B2 * | 9/2006 | Orita | | 188/296 |
| 7,343,999 B2 | 3/2008 | Cuddihy et al. | | |
| 7,455,256 B2 | 11/2008 | Morgan | | |
| 7,628,349 B2 | 12/2009 | Clute et al. | | |
| 7,828,331 B2 * | 11/2010 | Jessup et al. | | 280/805 |
| 7,836,550 B2 * | 11/2010 | Lin | | 16/303 |
| 7,862,087 B2 | 1/2011 | Martinovic | | |
| 8,070,184 B2 | 12/2011 | Hofferberth | | |
| 8,087,696 B2 * | 1/2012 | Mather et al. | | 280/807 |
| 8,167,100 B2 * | 5/2012 | Chen | | 188/290 |

(Continued)

*Primary Examiner* — Karen Beck
(74) *Attorney, Agent, or Firm* — Plager Schack LLP

(57) ABSTRACT

A safety enhancement for a safety belt comprises an actuator housing mechanically coupled to a first end plate, a rotor blade, an orifice plate, a second end plate, a coil, and a spring cover by an actuator axel. The orifice plate comprises an orifice that allows hydraulic fluid to pass from a first side of the rotor blade to a second side of the rotor blade in order to increase or decrease tension on a safety belt to reduce user movement.

4 Claims, 4 Drawing Sheets

(56) References Cited

U.S. PATENT DOCUMENTS

| | | |
|---|---|---|
| 8,191,965 B2 * | 6/2012 | Okimura et al. ......... 297/216.12 |
| 8,336,685 B2 * | 12/2012 | Inaba ........................... 188/290 |
| 8,516,657 B2 * | 8/2013 | Yoshida ............................ 16/50 |
| 2002/0153189 A1 | 10/2002 | Young |
| 2003/0192977 A1 * | 10/2003 | Specht ........................ 242/379.1 |
| 2003/0234145 A1 * | 12/2003 | Iwashita ....................... 188/290 |
| 2007/0102989 A1 | 5/2007 | Smith et al. |
| 2008/0054616 A1 * | 3/2008 | Rogers ........................... 280/805 |
| 2009/0050393 A1 | 2/2009 | Oyerokun et al. |
| 2010/0007125 A1 * | 1/2010 | Jessup et al. .................. 280/805 |
| 2011/0133439 A1 | 6/2011 | Pearce |

\* cited by examiner

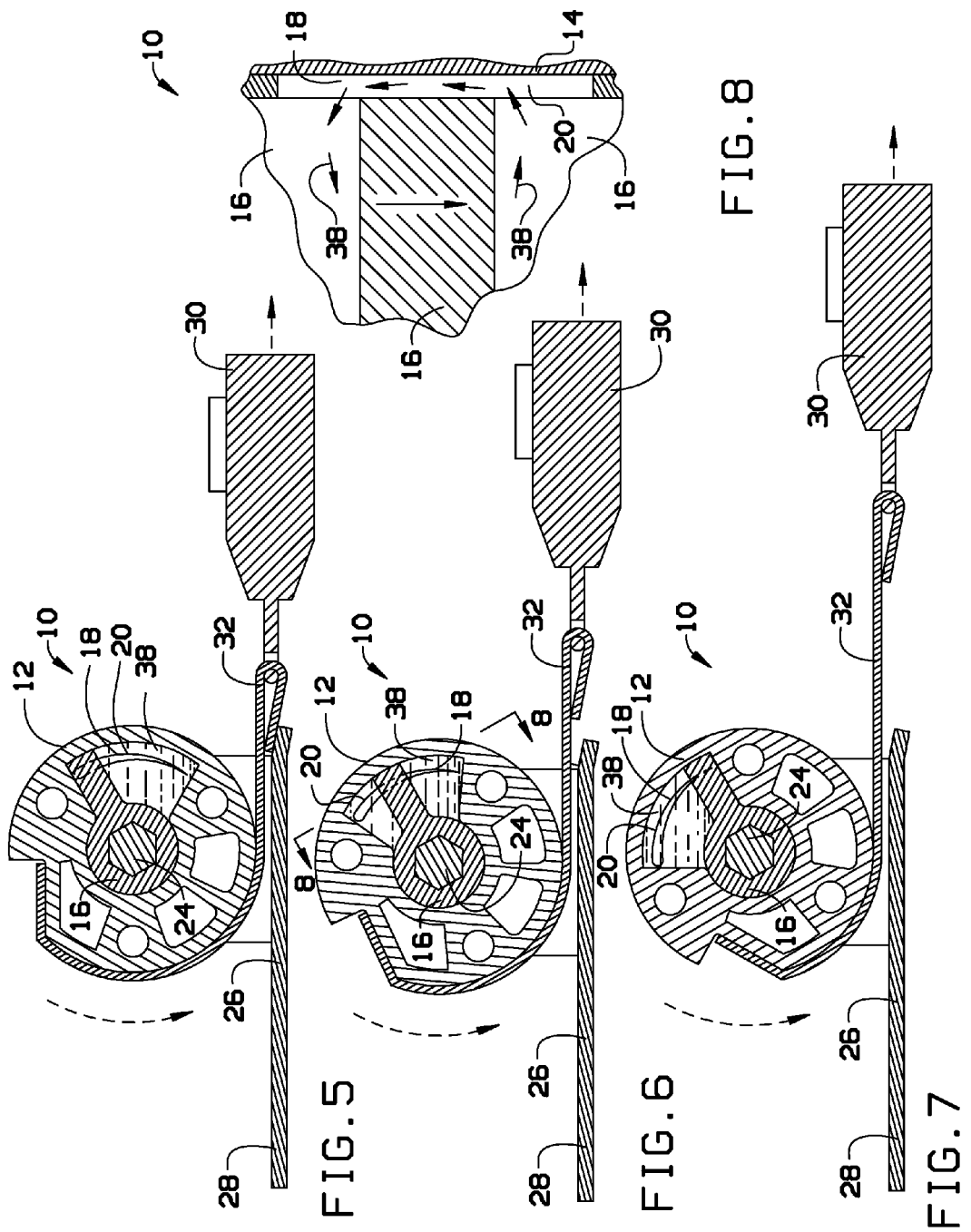

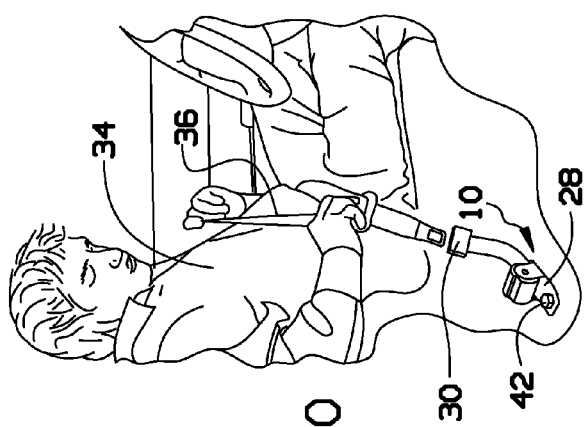
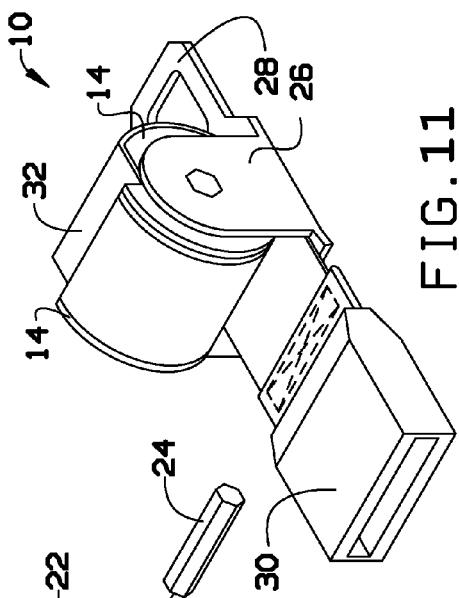
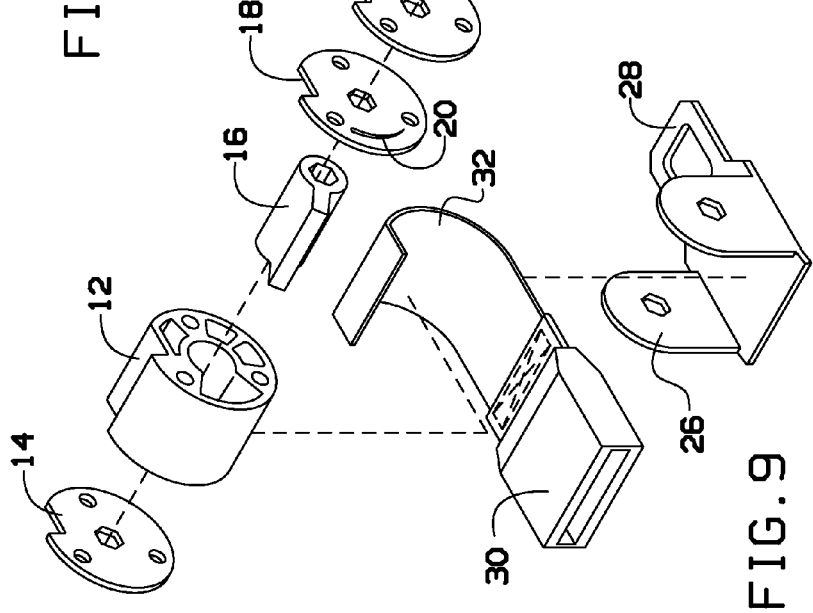

SAFETY ENHANCEMENT FOR A SAFETY BELT

FIELD OF THE INVENTION

This invention relates to devices that partially restrain an individual in a vehicle.

BACKGROUND OF THE INVENTION

This device relates to a safety belt. The general operation of a safety belt is known. The safety belt is mechanically coupled to a buckle ("buckled") around a user, which partially restrains the user. When the user moves forward, the buckle engages and prohibits further forward motion. Several theories of how to build such a device exist as will be described below.

U.S. Pat. No. 7,862,087 (Martinovic) teaches a hydraulic cushion for a safety belt, however Martinovic accomplishes this with a tooth and bore variety of orifice device as oppose to disclosed invention, which uses a specially shaped orifice plate. U.S. Pat. No. 7,828,331 (Jessup) also teaches a hydraulic cushion for a safety belt, similar to the disclosed invention Jessup uses a rotary formation with a rotor blade (which Jessup calls a wiper blade). Unlike the disclosed invention Jessup uses a throttle valve and a series of fluid chambers. Jessup and Martinovic both teach away from a specially shaped orifice plate that can guide the flow of hydraulic fluid. U.S. Pat. No. 6,209,916 (Smithson) combines the multiple chambers of Jessup and the tooth and bore system of Martinovic to create a "restriction flow path." Martinovic emphasizes how prior teaching cannot result in the disclosed invention. The prior art, alone or in combination teaches a "restriction flow path" and not a specially shaped orifice plate. Additionally, Martinovic, Jessup and Smithson are limited in their effectiveness by the shape of internal components in their devices. In particular, the orifice plate described below is unique to these references and the rest of the prior art.

BRIEF SUMMARY OF THE INVENTION

A safety enhancement for a safety belt comprises an actuator housing mechanically coupled to a first end plate, a rotor blade, an orifice plate, a second end plate, a coil, and a spring cover by an actuator axel. The orifice plate comprises an orifice that allows hydraulic fluid to pass from a first side of the rotor blade to a second side of the rotor blade in order to increase or decrease tension on a safety belt to reduce user movement.

BRIEF DESCRIPTION OF THE SEVERAL VIEWS OF THE DRAWINGS

Figure 1:
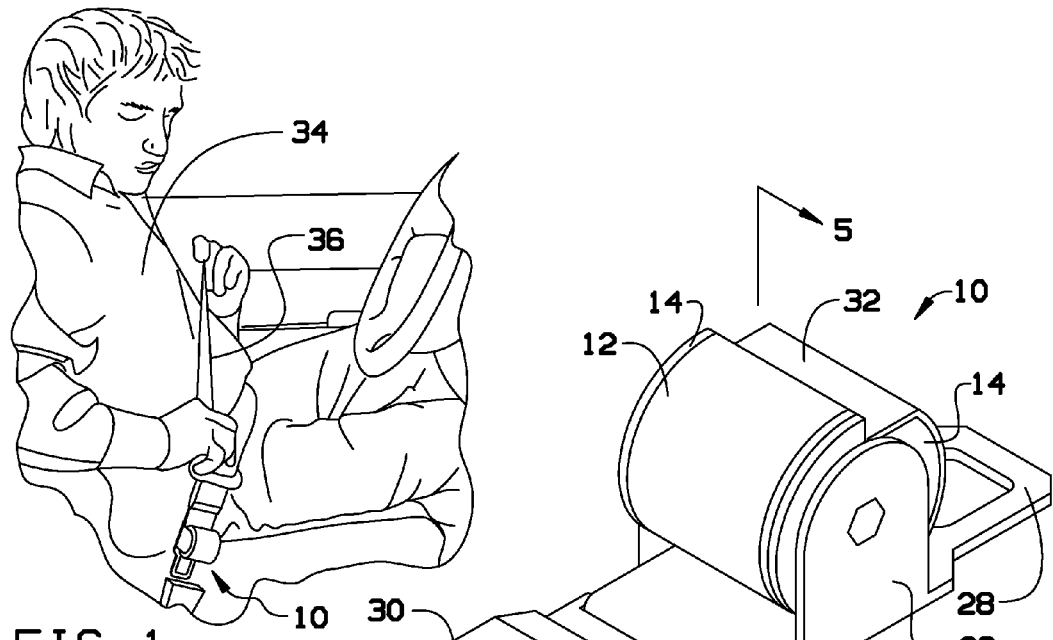
Figure 2:
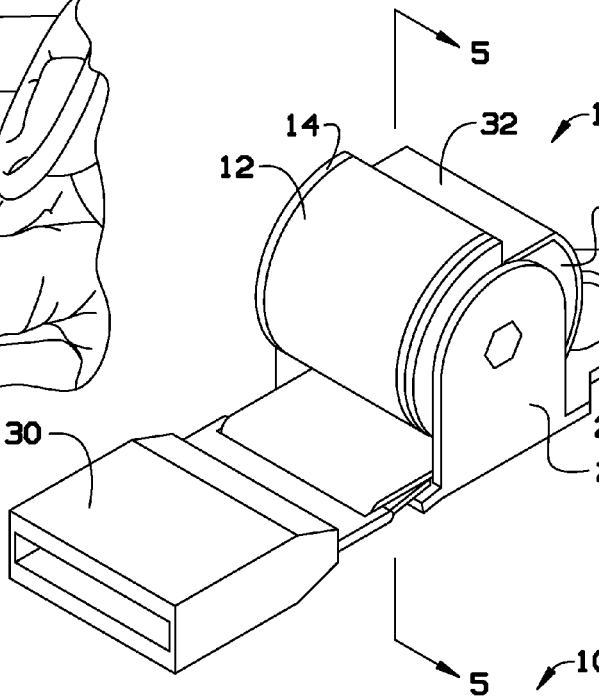
Figure 3:
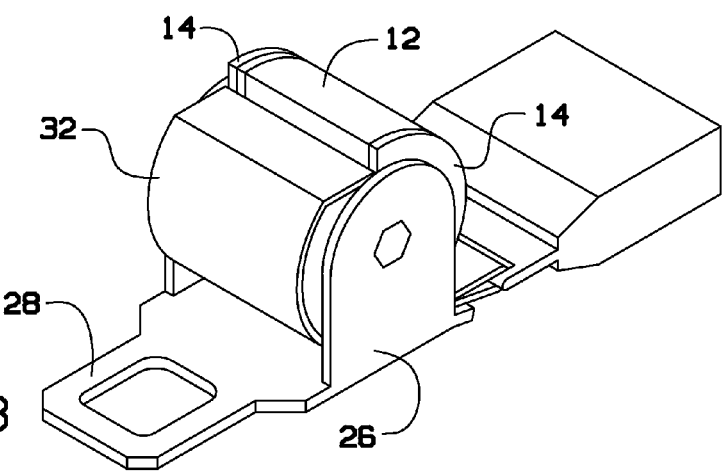
Figure 4:
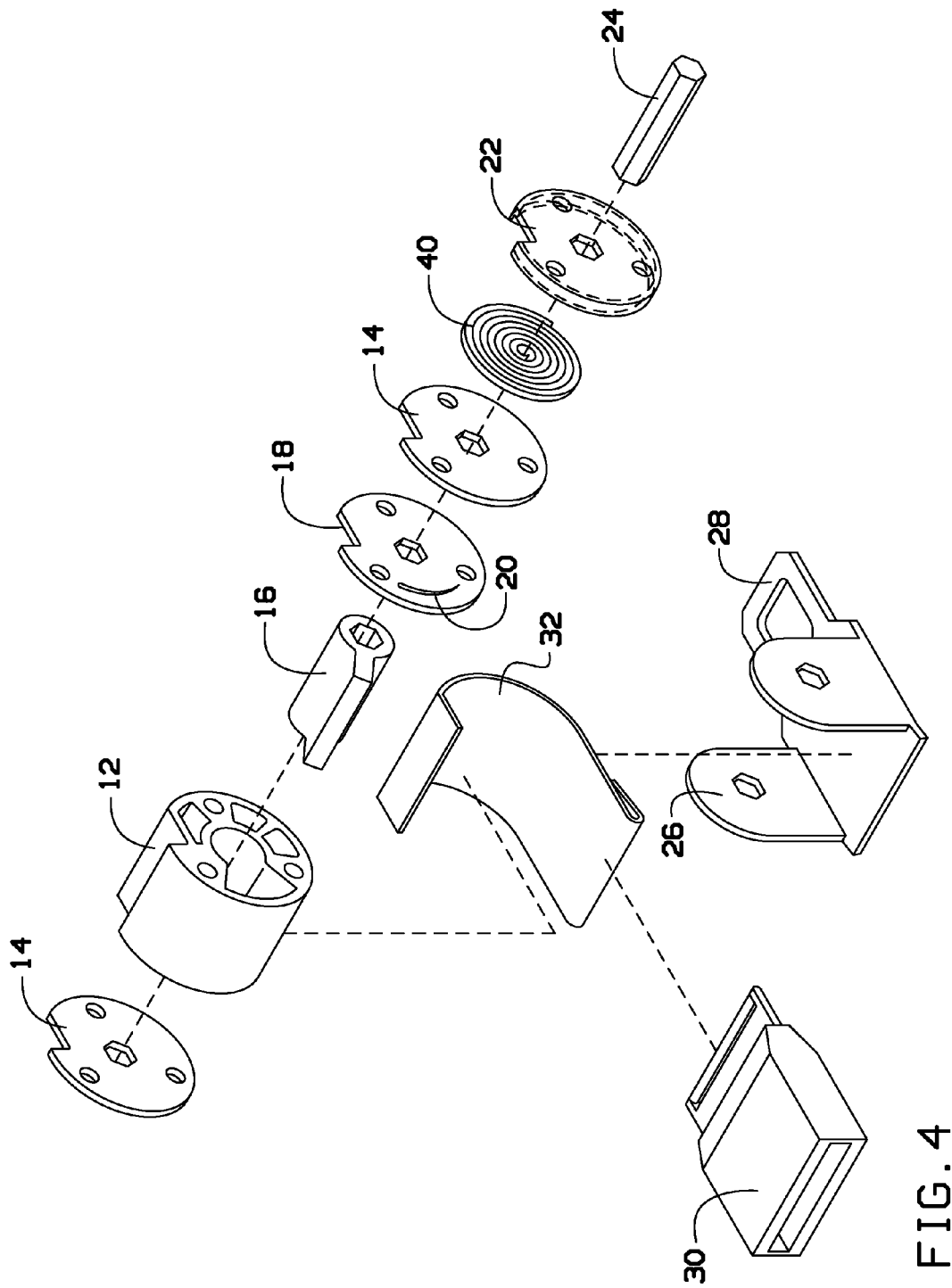

Having thus described the invention in general terms, reference will now be made to the accompanying drawings, which are not necessarily drawn to scale, and wherein:

FIG. 1 is a perspective view of the invention shown in use.
FIG. 2 is a forward perspective view of the invention.
FIG. 3 is a rear perspective view of the invention
FIG. 4 is an exploded view of the invention.
FIG. 5 is a section view of the invention along line 5-5 in FIG. 2 of the invention.
FIG. 6 is a section view of the invention.
FIG. 7 is a section view of the invention.
FIG. 8 is a section detail view of an alternate embodiment of the invention.
FIG. 9 is an exploded view of an alternate embodiment of the invention.
FIG. 10 is a perspective view of an alternate embodiment of the invention shown in use.
FIG. 11 is a perspective view of an alternate embodiment of the invention.

DETAILED DESCRIPTION OF THE INVENTION

Embodiments of the present invention overcome many of the obstacles associated with effectively restraining user movement with a safety belt, and now will be described more fully hereinafter with reference to the accompanying drawings that show some, but not all embodiments of the claimed inventions. Indeed, the invention may be embodied in many different forms and should not be construed as limited to the embodiments set forth herein. Rather, these embodiments are provided so that this disclosure will satisfy applicable legal requirements. Like numbers refer to like elements throughout.

FIG. 1 shows the invention in use. User 34 desires to restrain oneself with safety belt 26 and chooses to effectively accomplish this with safety enhancement 10.

FIG. 2 and FIG. 3 show safety enhancement 10 in more detail. Safety enhancement 10 comprises actuator bracket 26, which is mechanically coupled to actuator buckle 28 and buckle receiver 30. Actuator housing 12 is secured by first end cap 14 and second end cap 14 as shown in more detail in FIG. 4. Actuator housing 12 is mechanically coupled to actuator bracket 26 by bolt 24 (not shown). Actuator housing 12 is mechanically coupled to safety belt 32 as shown in more detail in FIG. 5, FIG. 6 and FIG. 7.

FIG. 4 is an exploded view of safety enhancement 10. Safety enhancement 10 comprises return spring cover 22 mechanically coupled actuator axel 24. Actuator axel 24 is mechanically coupled to actuator housing 12 and is immediately adjacent to coil 40, first end cap 14, orifice plate 18, rotor blade 16 and second end cap 14. In some embodiments, second end cap 14 and orifice plate 18 can be a single orifice plate 18. The orifice valve plate comprises orifice 20. Orifice 20 can be effectively shaped as a small line, slightly curved or straight but inclined from the vertical, or with the appearance of a small, filled-in number 9. Orifice 20 slows the flow of fluid from one side of rotor blade 16 to the other from full flow to zero flow through the motion of the actuator as shown in FIG. 5, FIG. 6, FIG. 7, and FIG. 8 below. This assembly is then inserted into belt 32 by inserting actuator axel 24 through actuator bracket 26. Belt 32 is mechanically coupled to buckle receiver 30 and actuator bracket 26 is mechanically coupled to actuator buckle 28 as noted above.

FIG. 5, FIG. 6 FIG. 7 and FIG. 8 show safety enhancement 10 in use. When force is applied to buckle receiver 30 belt 32 pulls actuator housing 12 causing rotor blade 16 to rotate. However, at first rotor blade 16 remains stationary pushing hydraulic fluid 38 from a first side of rotor blade 16 through orifice 20 and to a second side of rotor blade 16. As actuator housing 12 is rotated and rotor blade 16 is passed by orifice 20, the orifice 20 narrows reducing the flow throughout the travel of orifice 20 to zero flow. Flow is controlled not only by the shape of orifice 20 but the thickness of the orifice valve plate 18 which can be varied according to the range of force expected. For example; the weight of a child in a car seat it may need to be sized differently than for an adult. When tension is released coil 40 under spring cover 22 returns actuator housing 12 to its initial position as shown above. A check valve mounted in rotor blade 16 (not shown) can also provide a secondary path for hydraulic fluid 38 while returning to its original position for a quicker reset. In this manner, hydraulic fluid 38 as a cushion.

FIG. 9, FIG. 10 and FIG. 11 show an alternate embodiment of safety enhancement 10. In this situation, user 34 desires to be secured by safety belt 36, but rather than using an aftermarket safety enhancement 10, user 34 wants safety enhancement 10 secured to a car seat by bolt 42 through actuator buckle 28 in place of mechanically coupling actuator buckle 28 into an attached buckle receiver 30. Additionally, buckle receiver 30 is mechanically coupled to belt 32 by sewing. The construction is otherwise identical to that described above.

The invention claimed is:

1. A safety enhancement for a safety belt, the safety enhancement comprising,
   an actuator housing mechanically coupled to an actuator axel; the actuator axel is immediately adjacent to a first end plate, a rotor blade, an orifice plate a coil and a spring cover;
   wherein the actuator housing has the shape of a partial cylinder comprising a side defined by a point on the outside of the cylinder continuing partway to the center of the circle and a second side normal to the first side adjacent to the portion of the first side nearest the center of the cylinder and continuing to the outside of the cylinder;
   the orifice plate comprises an orifice that allows hydraulic fluid to pass from a first side of the rotor blade to a second side of the rotor blade in order to increase or decrease tension on the safety belt allowing user movement.

2. The safety enhancement of claim 1,
   the actuator housing is mechanically coupled to a belt in an actuator bracket,
   where the actuator bracket further comprises an actuator buckle which can fit into a buckle receiver.

3. The safety enhancement of claim 1,
   the orifice is effectively shaped as a small line, slightly curved or straight but inclined from the vertical, or with an appearance of a small, filled-in number 9 in order to move the hydraulic fluid more efficiently.

4. The safety enhancement of claim 1,
   the actuator housing is mechanically coupled to a belt in an actuator bracket;
   the actuator bracket further comprises an actuator buckle; and
   a bolt secures the buckle receiver to a car seat.

* * * * *